May 24, 1966 W. W. SANDIFER 3,252,631
FEED DISPENSING AND MEASURING APPARATUS
Filed June 19, 1964 4 Sheets-Sheet 2
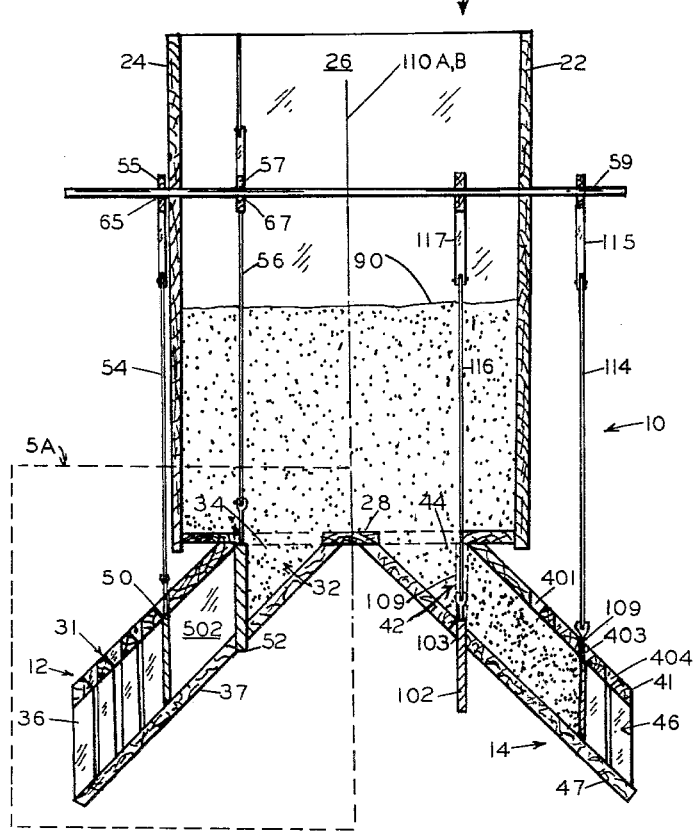
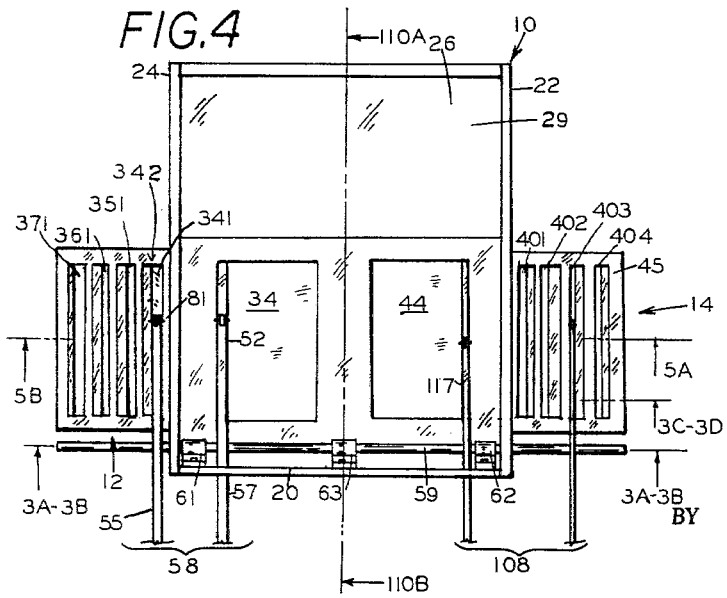
W. W. SANDIFER
INVENTOR.
BY Ely Silverman
ATTORNEY

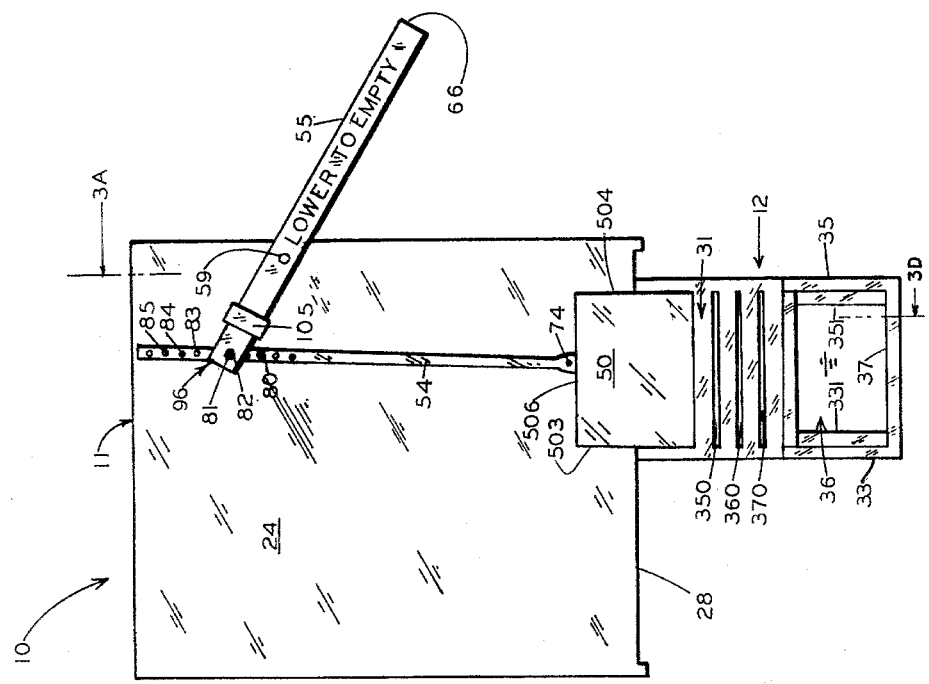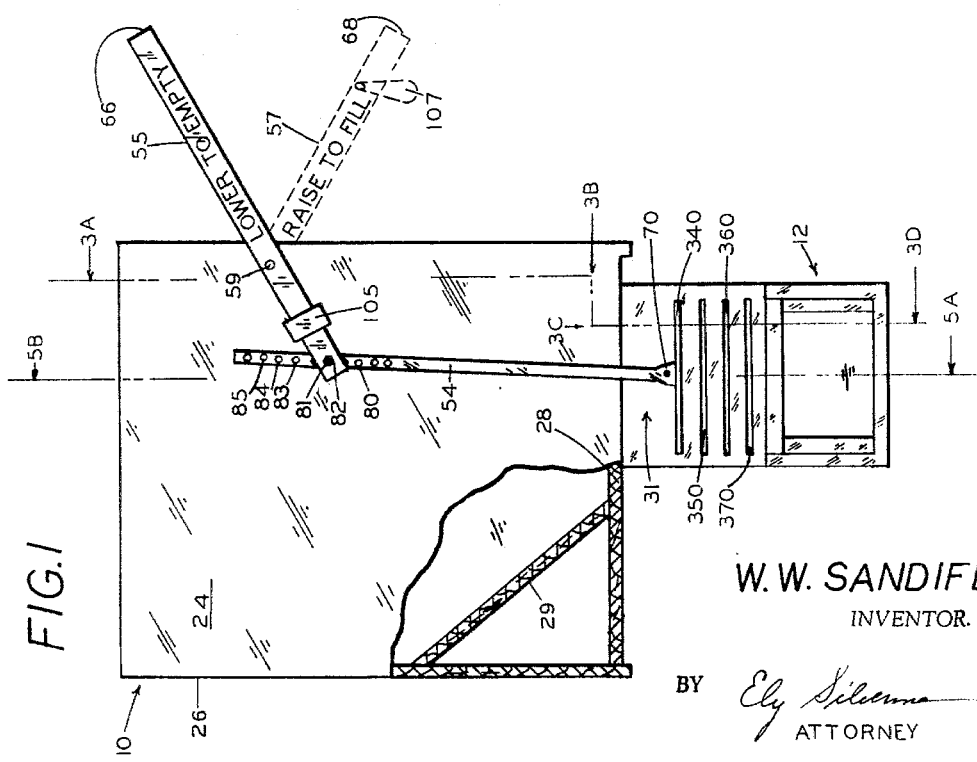

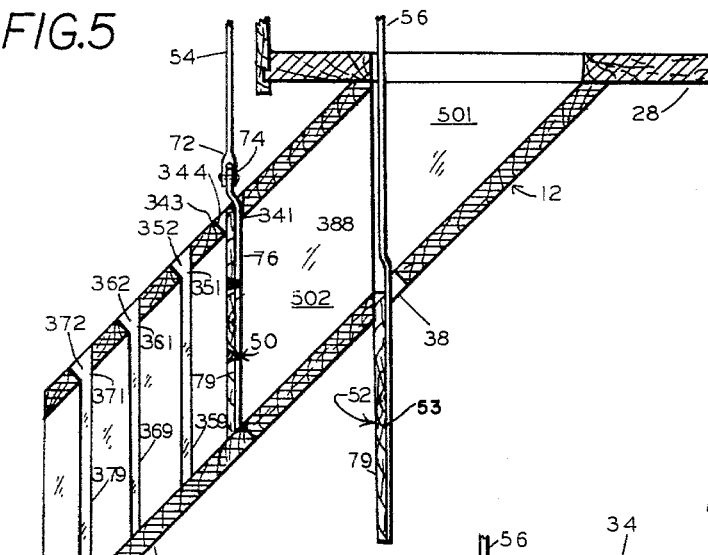
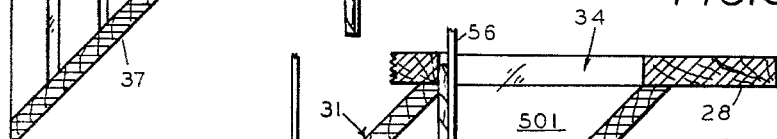
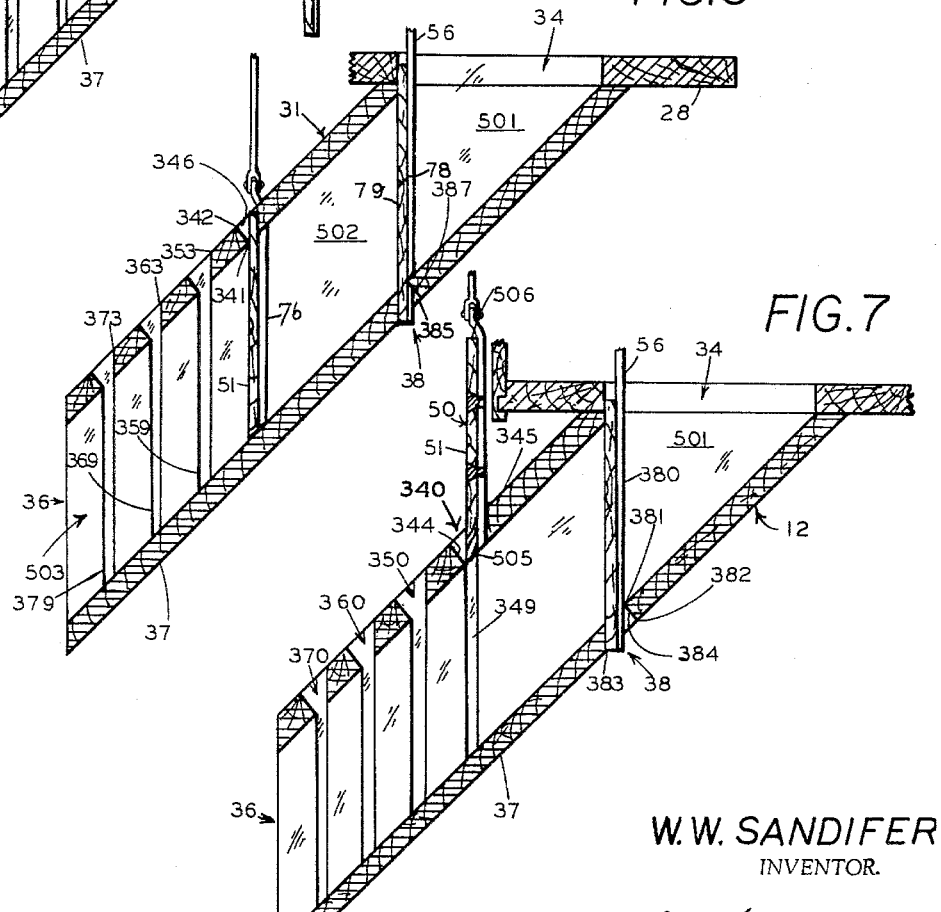

May 24, 1966 W. W. SANDIFER 3,252,631
FEED DISPENSING AND MEASURING APPARATUS
Filed June 19, 1964 4 Sheets-Sheet 4

W. W. SANDIFER
INVENTOR.

BY *Ely Silverman*
ATTORNEY

United States Patent Office 3,252,631
Patented May 24, 1966

3,252,631
FEED DISPENSING AND MEASURING
APPARATUS
Weldon W. Sandifer, 712 S. Ave. C, Kermit, Tex.
Filed June 19, 1964, Ser. No. 376,401
3 Claims. (Cl. 222—439)

This invention relates to an animal feeding dispenser.

More particularly, this invention relates to an improvement in metering apparatuses for granular material adapted for animal feeding.

One object of this invention is accordingly to provide an automatic animal feed storing dispensing and measuring apparatus which allows rapid yet accurate and convenient dispensing of granular material for animal feeding.

Another object of this invention is to provide an apparatus storing and dispensing animal feed for animal feed of a particularly simple and readily cleaned construction which is sturdy and reliable in operation.

Another object of this invention is to provide a container and dispenser of granular material permitting adjustments to be made in the amount of discharge therefrom at the same time providing an amount of the article corresponding exactly to a given volume.

Other objects of this invention will be apparent to those skilled in the art on a sturdy of the below specification, of which specification the drawings attached hereto form a part and wherein like numbers in said drawings refer to like structures in all said drawings, and wherein FIGURE 1 is a side view broken away in part showing an embodiment of apparatus according to this invention in the dispensing chamber loading position of the apparatus of this invention;

FIGURE 2 is a side view showing the apparatus of FIGURE 1 in its metered volume discharge position;

FIGURE 3 is a sectional view along the vertical flat planes 3A–3B–3C–3D of FIGURES 2 and 4 with apparatus 10 empty;

FIGURE 4 is a top plan view of the filled apparatus 10 of FIGURE 3 as viewed in the direction of arrow 4A of FIGURE 3;

FIGURE 5 is an enlarged sectional view of zone 5A of FIGURE 3 along the vertical flat plane indicated as 5A–5B in FIGURES 1 and 4 with the position of its parts shown in the metering chamber filling position;

FIGURE 6 is an enlarged view of the zone 5A of FIGURE 3 along plane 3C–3D of FIGURES 2 and 4 with the position of parts therein in the metered volume of feed retaining position;

FIGURE 7 is an enlarged view of zone 5A along plane 5A–5B showing the position of parts for discharge of a metered volume of feed;

Figure 8:
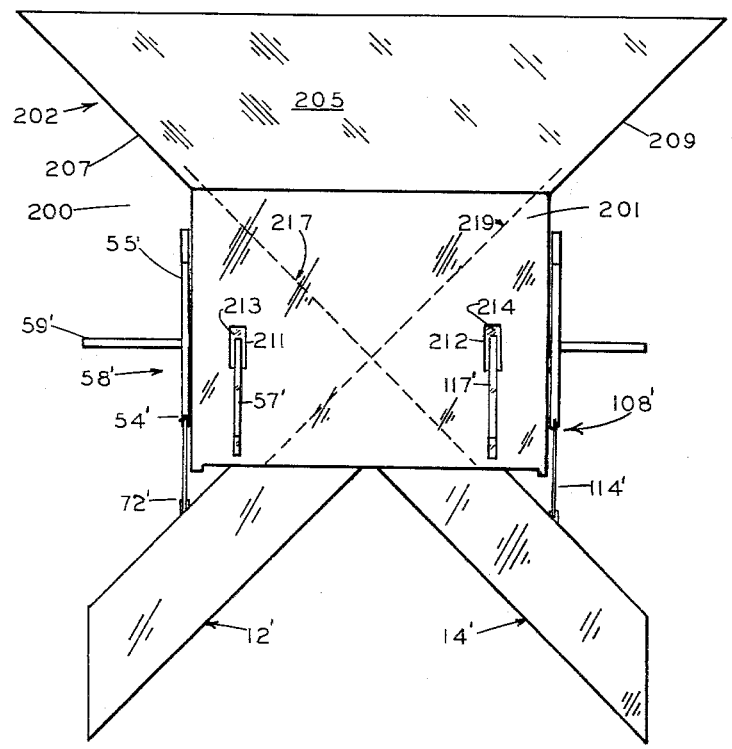
FIGURE 8 is a front view of another embodiment of apparatus within the scope of this invention.

Generally, the apparatus 10 of figures according to this invention comprises a central reservoir container 11 with discharge conduits 12 and 14 connected to the bottom thereof and a set of partitions and partition positioning subassemblies for each of the conduits 12 and 14.

The container 11 comprises a vertical front wall 20, vertical side walls 22 and 24, a vertical rear wall 26, and a generally horizontal floor 28. The floor has a downwardly and forwardly sloped rear portion 29. The left discharge conduit 12 is a mirror image of the right discharge conduit 14.

Discharge conduit 12 comprises a top wall 31, a left side wall 33, a right side wall 35, and a bottom wall 37 and conduit 14 comprises a top wall 41, a left wall 43, a right wall 45, and a bottom wall 47.

The walls 31, 33, 35 and 37 are joined at their edges and define a conduit chamber 32, having an inlet orifice 34 at its upper end and an outlet orifice 36 at its lower outlet end. Similarly, the walls 41, 43, 45 and 47 define a conduit chamber 42 which chamber has an upper inlet opening 44 and a lower outlet opening 46.

Chamber 10 is open to and continuous with chambers 42 and 32 through openings or orifices 34 and 44 which orifices are located in floor 28 and which pass completely through said floor.

Inlet partition 52 of set or subassembly 58 comprises a flat, thin rectangular in outline imperforate plate, about ³⁄₁₆-inch thick, 5½ inches high and 9¼ inches wide in the preferred embodiment herein described: it is rectangular in horizontal and verital cross-section with its inner, inlet surface 53 facing the direction of and open to the upper inlet orifice 34 of the conduit 12 when located in said conduit chamber 32.

Outlet partition 50 is identical in size and structure to partition 52 but different in location and function: it has its outer, outlet, surface 51 facing in the direction of and open to the lower, outlet, orifice 36 of the conduit 32 when that partition 50 is located in the conduit chamber as shown in FIGURES 1, 3, 5 and 6. The partitions 50 and 52 form a set or subassembly 58 and are each spaced apart along the length of conduit 12. Each partition 50 and 52 extends in a vertical plane transverse to the length of chamber 32 and in a plane parallel to the other.

An elongated rectangular inlet partition slot 38 is located in and extends through the bottom wall 37 of the conduit chamber 32 from an interior inlet partition slot orifice 381 to an exterior inlet partition slot orifice 382. Orifices 381 and 382 are parallel to each other and both rectangular in shape. The slot 382 is somewhat wider than the slot 381. The length of said slot 38 along the wall 37 extends transversely to the length of the conduit.

The inlet partition 52, which is a rectangular cross-section as viewed in a horizontal plane (and as shown in outline in FIGURE 4) slidably fits in the orifice 381 and occupies substantially the entire area of the inlet orifice 381: partition 52 thus provides a continued effective seal against passage of granular material of size larger than ¹⁄₂₀ of an inch through said slot and orifice 381 contains partition 52 in all operative positions of partition 52.

The outer orifice 382 is of larger size than the inner orifice 381. The front wall 383 and the rear wall 384 of the inlet partition slot 38 are flat and smooth. The edges of the orifices 381 and 382 for the slot 38 are also straight and smooth. The angle 385 between the rear slot wall 384 and the inlet partition wall 53 is substantial, 45° in the preferred emobdiment, and so permits free escape of any particle passing through any space 386 between upper orifice edge 387 and surface 78 which particle otherwise might wedge between the surface 78 and the edge 387.

The inlet partition 52 in its raised position extends from the inlet partition slot 38 in the bottom portion of the conduit to contact the rear end of the top wall 31 of said conduit and extends into orifice 34: partition 52 also extends from one side wall 33 to the other 35. It completely separates the portion 501 of the conduit chamber 32 on the inlet side of the inlet partition from the measured portion 502 of the conduit chamber 32 on the other side of that partition.

The inlet partition 52 is movable in the inlet slot 38 and the rear surface of that partition extends vertically from the slot 38 to the level of the bottom of the top conduit wall when the partition occupies substantially the entire area of said inlet partition slot orifice 381.

The volume or space occupied by the inlet partition in its upper, closed position as shown in FIGURES 6 and 7 is continuous at its top with the space encompassed by the orifice 34 between the conduit chamber 32 and the volume or space within the reservoir chamber 11.

A plurality of horizontally extending, rectangularly shaped, elongated outlet partition slots 340, 350, 360 and 370 are provided in and extend through the top wall portion 31 of the conduit 12. These slots are each parallel to each other and each is located in a vertical plane parallel to the vertical plane passing through the center of the inlet partition slot 38. Each outlet partition slot is spaced away from the adjacent similar slot along the length of the conduit 32. The length of each of said outlet partition slots extends transverse to the conduit chamber 32. The outlet partition 50 may slidably fit in each of said outlet partition slots. There is only one such outlet partition used at a time for each discharge conduit as 12 and 14 in the embodiment shown in FIGURES 1–7 and that one partition is used in only one outlet slot at a time.

Each slot 340, 350, 360 and 370 respectively, comprises an inner orifice as 341, 351, 361 and 371, a passage as 342, 352, 362 and 372 and an outer orifice 343, 353, 363 and 373, respectively. All these slots, passages and orifices are of the same size and shape although located in series along the length of conduit wall or roof 31. These horizontal slots each found a volume or space which is continuous with the volume defined or occupied by a vertical slot in the conduit side wall of each side of each such horizontal slot. Each partition fits and slides through a horizontal slot and also is laterally supported and slides in the vertical slots or recesses in the conduit side walls associated with such horizontal slot.

The outlet partition 50 has a rectangular cross-section as viewed in a horizontal plane (and as shown in outline in FIGURE 4) and slidably fits in the inner orifice 341 and occupies substantially the entire area of the outer orifice 341 of the outlet partition slot 340 and provides an effective seal thereacross against passage of granular material of size larger than 1/20" through said slot when said orifice contains said partition.

Each outer orifice as 342 is of larger size than the corresponding inner orifice as 341. The front wall as 344 and the rear wall as 345 of each inlet partition slot are flat and smooth. The edges of the orifices for the slots are straight and smooth. The angle as 346 between each front slot wall as 344 and the inlet partition wall 50 is a substantial acute angle, 30° in the preferred embodiment, and so permits free entry of the partition into the inner orifice, as 341, from the outer orifice, as 343, for each of the slots 340, 350, 360 and 370.

The outlet partition 50 in its lowered position extends from the outlet partition slot as 340 in the top portion of the conduit to the top of the flat bottom wall 37 of said conduit and the partition extends from one side wall as 33 to the other as 35. It effectively separates the portion of the conduit chamber 32 on one side of the outlet partition, as portion 502, from the portion 503 of the conduit chamber on the other discharge side of that partition when partition 50 is in its lowered position as shown in FIGURES 3, 5 and 7.

The outlet partition 50 is freely movable in the outlet slot 340 and when the rear surface of that partition extends from the slot 340 to the level of the top of the bottom conduit wall it occupies substantially the entire area of said outlet partition slot orifice 341.

Vertical slots, each open to each conduit chamber, are provided immediately below each outlet partition slot and immediately above each inlet partition slot on the conduit side walls in register with side edges of such horizontal slots in the top or bottom wall portion of each conduit, i.e., the recesses provided by such vertical slots each define or encompass a volume or space continuous with the volume or space defined by the walls of the respective horizontal slot therefor. As shown in FIGURES 3, 5, 6 and 7 edges of and space therebetween of vertical slot 349 are continuous with the edges of and space therebetween of orifice 341 at the bottom of horizontal slot 340; vertical slots 388 and 109 are continuous with the orifice at the top of slot 38 and 103, respectively, and vertical slots 359, 369, 379, 405, 406, 407 and 408 are respectively similarly continuous with horizontal slots 351, 361 and 371, 401, 402, 403 and 404. Slots parallel to the aforementioned illustrated vertical slots are also provided on the opposite side of the conduit and continuous with the aforementioned respectively continuous horizontal slots, respectively. All such vertical slots are of the same size and depth and shape. All are rectangular in cross-section and of equal depth and width for their entire length. All such slots extend vertically from the bottom wall portion to the top wall portion thereabove. The width of each of the partitions 50, 52, 100 and 102 is sufficient to keep it firmly yet slidably located in the vertical slots therefor and the vertical slots form with the partition therein an effective seal against passage of granular material therepast. The bottom of partitions 50 and 100 are straight and smooth and have the same slope as the smooth-surfaced top of bottom wall portions 37 and 47. The top surface of bottom walls 37 and 47 each have a uniform slope throughout its length. The bottom surface and edges of the inlet partitions accordingly form an effective seal against passage of material between those partitions and the conduit floor in all the operative closed positions provided therefor according to this invention.

Each of the partitions, as 50 and 52 in conduit 12 (and corresponding partitions 100 and 102 in the conduit 14) are provided with independently movable positioning means in turn supported on means supported on the reservoir chamber. More particularly, the outer partition 50 is supported at its top by an outlet partition support bar 54. An inlet partition bar 56 is firmly attached to the top of partition 52. The bar 54 is rigid and strong although flat. The bar 54 is, in the preferred embodiment, pivotally attached to a pivoted lift arm 55 as shown in FIGURE 1. Bar 56 is pivotally attached to an inlet partition lift arm 57. A rigid, horizontal lift arm pivot bar 59 passes through holes 65 and 67 in bars 55 and 57, respectively. The bar 59 is firmly supported on brackets 61, 62 and 63 in a horizontal position on the wall 20 of the container 10. Bar 59 extends laterally horizontally for the same lateral distance from walls 24 and 22 as do the conduits 12 and 14. The bars 55 and 57 may be, by this invention, provided with weights 105 and 107, respectively, firmly attached thereto as by bolts to provide a means connected to and holding the inlet partition 52 in its upward closed position and the outlet partition 50 in a lowered and closed position as shown in FIGURE 1 if the weight of the arms 55 and 57 do not. Accordingly, the partitions 50 and 52 are automatically closed and only one arm need be manipulated at a time to effect filling or discharge, as per direction as shown on those arms in FIGURE 1, of the measured volume between the inlet and outlet partitions as 52 and 50. The outlet partition 50 is fixedly attached to the support bar 54 therefor as by locking pin 70, which pin is fixed to a locking yoke 72 at the bottom of bar 54. Bar 54 is thus firmly and rigidly attached to partition 50 via lug 74 at the top of a plate 76 which plate is firmly attached to the back of partition 50.

Each outlet partition lift bar as 54 (and 114) is provided with a series of spaced-apart holes as 80, 82, 83, 84, 85 near its upper end. Each bar as 114 and 54 is attached by a removable pin 81 to a pin-holding yoke 96 at the left end of the pivoted lift arm 57 as shown in FIGURE 1. Each of the series of holes, 80, 82, 83, 84 and 85, is located at close vertical intervals to permit adjustment of the effective length of the arm as 54 (and 114) between the lift arm (as 55 or 115) and the partition as 50 (and 100) supported thereby. Such adjustment permits that the travel of arm 55 in a 45° arc about pivot bar 59, which arc extends about 22° above and 22° below the horizontal, produces sufficient movement of the pin 81 and arm 54 to rapidly and efficiently move the partition as 50 to its open and closed position as herein described. Removal of the pin from the hole 82 in which it is shown used in FIGURE 1 and replacement thereof in differently spaced holes as 80, 83, 84 and 85 of such series permits adjustment of the effective length of the arm, as 54, for use in any one slot, as 34, and also extension and adjustment of the effective length of such arm for use of the partition in other slots as 350, 360 and 370 as herein described for movement of the partition 50 in slot 34.

The parallelism of the bottom surface of the top wall surface and the top surface of the bottom wall and the parallelism of the inner side walls of each conduit, as 32, avoids a wedging and compressing and possible jamming of the granular materials moving through the conduit chambers as 32. This arrangement also avoids change of density of material which passes through the chamber. Inasmuch as the voulme of (or space occupied by) the inlet partition 52 is continuous with the volume of (or space occupied by) the reservoir chamber, on upward motion of the partition 52 there is no interference with the movement of the partition by jamming of granular material inasmuch as there always is a free level 90 on the top of the mass of granular material in reservoir 10 which free level permits that the upward motion of the partition 52 may move any stuck granular material from the measured volume in chamber portion 502 in an upward direction rather than effecting any compaction and jamming. In previous devices of this type such as in United States Patent 643,683, it was not feasible to move a partition through a mass of granular material in a confined volume because such material would wedge and pack, and prevent the passage of the partition therethrough. Accordingly, only approximately filled volumes could be used for measuring purpose in order to avoid the packing of granular material between the closing member and the edge of the orifice between the adjacent chambers, the volumes of which it was desired to separate.

According to this invention, the granular material volume to be measured and dispensed is separated from the reservoir volume from which derived is effected by a partition (as 50 or 100) which moves vertically upward therebetween and there is provided on the reservoir mass a free, unconfined movable level 90 which permits the movement of granular material displaced by such separating partition toward said unconfined surface, and thereby avoids binding and permits the striking off of a definite volume for measurement of granular material.

Because the bottom floor of the conduit is sloped at an angle which is substantially greater than the angle of repose of the granular material, the chamber as 502 between the inlet and outlet partitions as 52 and 50 will always be filled on complete downward motion of the inlet partition 52 when the outlet partition 50 is in its closed position as shown in FIGURE 5. As the upper, top surface of the chamber, top conduit wall portion 31, has a slope at least equal to the angle of repose of said mass, the upper volume of the measuring chamber 502 will also be completely filled, thereby providing for a fixed volume of granular material to be always measured in that particular portion of the conduit chamber between the inlet and outlet partitions therefor.

In operation of the apparatus of FIGURE 1 the outlet partition 50 is initially at (if not brought to) the closed position by moving the outer end 66 of the arm 55 upwards as shown in FIGURE 1. This closes off the to-be-measured volume or portion, as 502, of the inlet conduit from the portion 503 of the conduit chamber 32 between said partition and the outlet 36.

Second, the inlet partition 52 is opened by moving the arm 55 to the position thereof with end 68 thereof raised. This moves the inlet partition 52 for the conduit 32 to partitioning position shown in FIGURE 6 and, as above described, severs from the main mass of granular material in the reservoir chamber 10 that mass enclosed in the thereby struck or measured volume as 502 between conduit partitions as 50 and 52, side walls as 33 and 35 and the bottom and top conduit wall portions as 37 and 31 of the conduit as 32.

Because of the parallel relationships of the top wall and bottom wall and of the two side walls to each other in the conduit 32, there is no compression of the material therein. Because of the unconfined nature of the level 90 of the material in the reservoir chamber, there is no jamming of the to-be-measured material and the inlet partition as 52 freely moves through the granular mass from the bottom edge of the portion to be severed to the top thereof.

Emptying of the measured volume chamber as 502 is accomplished by first moving the inlet partition, as 52, to the closed position: a weight 107 may be put on the end 68 of the arm 57 to return or maintain the end 68 of arm 57 in the downward position as shown in FIGURE 1. Accordingly, a positive act is necessary to open the orifice closed by the inlet partition as 52, and, as soon as the operator's hand is removed from the lever arm therefor, the inlet partition 52 will close. This feature prevents the inadvertent loss of material without positive steps required by the operator. Accordingly, after the filling step the inlet partition is automatically closed.

The emptying stage for the measured volume as 502 between the inlet and outlet partition, as 50 and 52, is accomplished by moving the outlet partition 50 to its open position. This is accomplished by moving the outer end 66 of the arm 55 downwards, to a position as shown in FIGURE 2. Inasmuch as the floor of the conduit has an angle with the horizontal greater than the angle of repose of the granular material, such material thereabove then completely and thoroughly empties itself from the measured volume space 502 between the partitions 50 and 52.

According to the process of the apparatus of this invention, its inherent operation is that after the compartment 502, or its equivalent as below discussed, is filled then the arm 57 automatically falls to the closed position shown in dotted lines in FIGURE 1, in which position it is also shown in FIGURE 2. It is also a characteristic of this apparatus as above described in the preferred embodiment, each inlet partition thereof as 52 (and 102) is maintained in its closed position as above described.

The volume of the material discharged from the measured volume, as 502, between the inlet partition as 52 and the outlet partition as 50 may be varied by moving the outlet partition as 50 from slot 34 and its associated vertical slots into any of the other horizontal inlet partition slots as 350, 360 or 370 and their associated vertical slots while the inlet partition operates in the same, horizontal inlet slot 38 and associated vertical slots.

Similarly, the volume discharged from chamber 42 may be varied by filling and discharging a chamber whose size varies as the outlet partition as 100 is moved in one slot or another as 401, 402, 403, 404 in chamber 42. These slots 401, 402, 403 and 404 are identical in structure and spacing to slots 340, 350, 360 and 370. Partitions 100 and 102 form a subassembly or set 108 and are each identical in structure and function to partitions 50 and 52.

The positioning subassembly for each outlet partition as 50 or 100 (said latter subassembly comprising bar 114 corresponding to bar 54, a pivot pin corresponding to pin 81 and arm 115 corresponding to arm 55), is moved laterally along bar 59 laterally of wall 24 or 22 the same distance as the slot as 360 or 403 into which that outlet partition as 50 or 100 is moved in order to thereby maintain the positioning subassembly for each movable partition in the same vertical plane as said partition, as shown for outlet partition 100 in FIGURE 3. Bar 59 extends as far laterally as the conduits 12 and 14, as shown in FIGURES 3 and 4 to accommodate esuch lateral movement of arms 55 and 115.

In a particular embodiment of this invention the dimensions of the apparatus of FIGURES 1–7 are as in Table I.

In the preferred embodiment of this invention herein described the volume contained between partitions when the partitions are in conduit closing position as in FIGURE 6 and located in the various slots in conduits 12 and 14 therefor (and delivered therefrom) is as listed in Table II.

Arm 54 has connection—as do arms 114, 116 and 56—to the partition plate attached halfway between the side edges of such partition at the top thereof as above described and such arm extends vertically thereabove. This minimizes any tendency of the partition plate edges to take a skewed position and/or jam in the slots provided in the conduit walls therefor. In the preferred embodiment the slots extend outward from the inner surface of the effective conduit walls toward the outer surface thereof with the portions of the effective inner surface of the side walls of the conduit which bound the chamber 32 between the slots smooth and vertical and flat.

TABLE I
*Dimensions of exemplary apparatus*

| Item and Description | From/To | Dimension |
| --- | --- | --- |
| Container 11: | | |
| Height overall | Top of 24 to bottom of 24 | 31⅞″. |
| Width overall | Outside of 32 to outside of 26 | 22½″. |
| Depth | Front of 20 to rear of 26 | 26½″. |
| Material, sheet | ¾″ plywood | |
| Fasteners | 1½ x 9 FH wood screws | |
| Member 29 | Height from bottom | 12″. |
| Member 29 | Distance from rear | 10″. |
| Conduits 12 and 14: | | |
| Overall width | Orifice 36 to orifice 46 | 35½″. |
| Overall width | Outside of 33 to outside of 35 | 11⅛″. |
| Opening | Inner side of block 331 to inner side of block 351 | 9. |
| Slot depth | Lateral depth of slots 34, 38, 350, 360, 370 | 3/16″. |
| Effective width of opening 36 | Distance between blocks 331 and 351 | 9″. |
| Slot spacing | Outlet side of slot 380 to inlet side of slot 349 horizontal distance | 4⅛″. |
| Slot thickness | Thickness of slot 349 | ¼″. |
| Height of opening 35 | Bottom of 31 to top of 37 at orifice 36 (vertical distance) | 5⅝″. |
| Slot spacing | Outlet side of slot 349 to inlet side of slot 350 | 13/16″. |
| Partition 50 (tempered hardboard): | | |
| Width | Left edge 503 to right edge 504 | 9¼″. |
| Height | Bottom edge 505 to top edge 506 | 5½″. |
| Thickness | Surface 78 to surface 79 | 3/16″. |
| Partition Positioning Subassembly: | | |
| Left bars | ¼″ x ¾″ steel | 24″ long. |
| Pin 81 | ¾″ sleeve bolt | ¾″ long. |
| Holes 80, 82, 83, 84, 85 | Diameter | ¼″. |
| Bar 59 | Round steel rod | ½″ diameter. |

TABLE II

Partition 52 in slot 38 and partition 50 in slot:      Volume between partitions, qts.

340 ------------------------------------- 3
350 ------------------------------------- 4
360 ------------------------------------- 5
370 ------------------------------------- 6

Partition 102 in slot 103 and partition 100 in slot:

401 ------------------------------------- 3
402 ------------------------------------- 4
403 ------------------------------------- 5
404 ------------------------------------- 6

Blocks as 331 and 351, each 5/16 inch thick in the embodiment, FIGURES 1–7, are attached to the inner surface of outer side walls as 33 and 35.

In view of the slight amount of motion sideways of the partitions in their vertical slots and the lateral vertical slots, it is within the scope of this invention that each control arm as 54 be fixedly attached directly to the partition plate, as 52 to which attached: this is accomplished without any risk of jamming where, as in the embodiment of FIGURES 1–7, only a small depth of granular material in the conduit, as 32, is involved and a vertical travel by partition 52 of only a few inches is involved. If the arm as 54 is of such thickness that it projects beyond the outline of partition a corresponding recess fitting said arm with the same degree of snugness as the rectangular slot fits the remainder of the partition is provided therefor in the slot or slots provided for such partition.

Inlet partition 102 is operatively connected to bars 116 and 117, which correspond in structure and function and relation to bar 59 in the same manner as partition 52 is connected to bars 56 and 55 and 59.

The dimensions above given are for the apparatus of FIGURES 1–7 for an animal feed dispenser directed at feeding pellets. For dispensing of more finely divided materials, as flour and cement, closer dimensions would be used to prevent leakage past the partition orifices above discussed.

Figure 9:
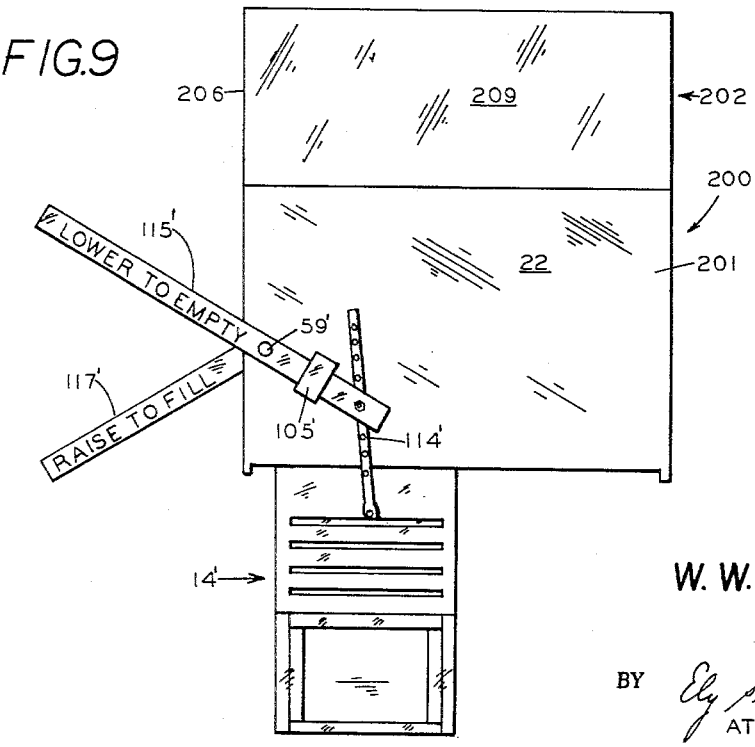
FIGURE 9 is a side view thereof.

The embodiment 200 shown in FIGURES 8 and 9 is especially adjusted for dispensing pelleted and/or crushed and/or rolled feeds admixed with grass or other fibrous material. The embodiment 200 comprises an upper inlet and reservoir chamber 202 (fully open at its bottom to the fully open top of chamber 201) lower reservoir chamber 201 and discharge conduits 12′ and 14′ and partition positioning subassemblies 58′ and 108′. The lower reservoir chamber 201 is shorter (only 18 inches high) than that shown in FIGURES 1–7, but otherwise the reservoir chambers 11 and 201 are identical. Conduits 12′ and 14′ are identical in structure to conduits 12 and 14. The relationship between conduits 12′ and 14′ and the bottom portion of reservoir chamber 201 are identical to those of conduits 12 and 14 to the bottom portion of reservoir chamber 11. The partition subassemblies 58′ and 108′ are identical to subassemblies 58 and 108 above discussed except for that in apparatus 200 the rod 59′ (which corresponds to rod 59 in apparatus 10) is closer to the bottom of the chamber 201 than in apparatus 10 to avoid mechanical interference by chamber 202 with the vertical movement of the partition positioning means, as 114′, 54′, 115′ and 55′ (corresponding to bars 114, 54, 115 and 55 respectively). Orifices 211 and 212 are provided on the side walls of reservoir 201 as for chamber 11 to provide passage for rod 59′ and arms 57′ and 117′.

The upper inlet and reservoir chamber 202 is open at its top; it comprises a vertical front wall 205, a vertical rear wall 206, and sloped side walls 207 and 209. These walls are imperforate and smooth, as are all the other walls heretofore mentioned except for those instances where slots, recesses, and orifices therein are expressly recited.

The arms 57′ and 117′ of embodiment 200 (corresponding to arms 57 and 117 of apparatus 10) are provided on the inside of chamber 201 with resilient sealing diaphragm caps 213 and 214, respectively. These caps extend over and are attached to the bars 57′ and 117′ between rod 59′ (corresponding to rod 59) and wall 205 and resiliently press against the inner surface of said wall and thus prevent leakage of material past the orifices as 211 and 212 in wall 201 for such bars 57′ and 117′.

Side walls 207 and 209 are imperforate and sloped to the horizontal at an angle of 45° in the embodiment of apparatus 200. The extension of the plane of the interior surface of each of walls 207 and 209 is shown by lines 217 and 219 respectively in FIGURE 8. The slopes of such interior surfaces are greater than the angle of repose of the material to be carried therein. The extension of the plane of the inner surfaces of the walls 207 and 209 toward the other side of the chamber 201 than that on which the sloped surface is located is higher than the bottom of the conduits (12' or 14') located nearest to that other side as measured at any point vertically above the inlet orifice to that conduit. This arrangement of sloped surfaces 207 and 209 relative to the bottom walls of conduits as 12' and 14' and the orifice in chamber 201 opening into each such conduit prevents bridging and accumulation of material in chamber 201 and facilitates material flow from chamber 202 to conduits 12' and 14'.

In the preferred embodiment of apparatus 20 the width of the top of upper inlet reservoir, which top is open, is 35 inches. While not preferred it is within the scope of this invention that the connection between partitions as partition arms, as 114 and 54, 114', 54', 56 and 116 may be pivoted at the yoke, as 72, between the partition and the vertically moving arm connected thereto.

Although in accordance with the provision of the patent statutes, particular preferred embodiments of this invention have been described and the principles of the invention have been described in the best mode in which it is now contemplated applying such principles, it will be understood that the operations, constructions and compositions shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

I claim:

1. A dispensing and metering device for granular material comprising a reservoir chamber and a dispensing conduit, said conduit having one inlet opening at an upper end thereof and one discharge opening at a lower end thereof, the inlet opening at the upper end of the conduit being open to said reservoir chamber, said conduit having a bottom wall portion, side wall portions and a top wall portion, said portions being joined together and enclosing a conduit chamber, said conduit chamber extending longitudinally at an angle to the horizontal from said inlet opening, the upper surface of said bottom wall portion being obliquely sloped at an angle to the horizontal at least as great as the angle of repose of said granular material, the bottom surface of the top wall portion of said conduit being obliquely sloped at an angle to the horizontal at least as great as the angle of repose of said granular material;

a set of vertically extending partitions for said conduit, said set comprising an inlet partition with its inner surface facing the direction of and open to the inlet opening of the conduit when located in said conduit chamber, and an outlet partition with the outer surface facing in the direction of and open to the discharge opening of the conduit when in the conduit chamber, each partition of said set being movable to a position in said conduit chamber, said partitions of said set being spaced apart along the length of said conduit and each partition extending in a plane transverse to said length and each movable into and out of said conduit chamber, an elongated inlet partition slot in and extending through the bottom of the conduit chamber, the length of said slot extending transverse to the length of the conduit, said inlet partition slidably fitting in and occupying substantially the entire area of said inlet partition slot, said inlet partition in its raised position extending from the inlet partition slot in the bottom wall portion of the conduit to the top wall portion of said conduit and from one side wall to the other side wall of said conduit and completely separating the portion of the conduit chamber on one side of the inlet partition from the portion thereof on the other, the top of said inlet partition being movable to the level of the top of said bottom conduit wall, said partition then occupying substantially the entire area of said inlet partition slot, an elongated outlet partition slot in and extending through the top of the conduit at a position spaced away from the inlet partition slot along the length of said conduit, the said outlet partition extending lengthwise transverse to said conduit length, said outlet partition slidably fitting in said outlet partition slot and substantially completely filling the area of said outlet partition slot, the bottom of said outlet partition being movable to the bottom of said conduit top wall portion, said partition then substantially completely filling said outlet partition slot, and independently movable positioning means operatively connected to each of said partitions, said positioning means each being supported on means attached to said reservoir chamber, and wherein the volume occupied by the top of the inlet partition in its upper, closed position is located within the inlet opening between the conduit chamber and the reservoir chamber, and said apparatus also comprising means supporting said positioning means for said outlet partition movable in a direction parallel to the longitudinal axis of said conduit and additional outlet partition slots in the top portion of the conduit, each longitudinally spaced along the length of said conduit from said inlet partition slot.

2. Apparatus as in claim 1 comprising also an inlet chamber for said reservoir chamber on top of said reservoir chamber and open at its bottom to the top of said reservoir chamber, said inlet chamber being continuous with said reservoir chamber, said inlet chamber having outer walls at an angle to the horizontal and sloped inwardly and downwardly to said reservoir chamber.

3. A dispensing and metering device for granular material comprising;

a reservoir chamber and a plurality of dispensing conduits, each said conduit having one inlet opening at an upper end thereof and one discharge opening at a lower end thereof, each inlet opening at the upper end of the conduit being open to said reservoir chamber, each said conduit having a bottom wall portion, side wall portions and a top wall portion, said portions being joined together and enclosing a conduit chamber, each said conduit chamber extending longitudinally at an angle to the horizontal from said inlet opening, the upper surface of each said bottom wall portion being obliquely sloped at an angle to the horizontal at least as great as the angle of repose of said granular material, the bottom surface of the top wall portion of each said conduit being parallel to the top surface of the bottom wall portion thereof and obliquely sloped at an angle to the horizontal at least as great as the angle of repose of said granular material;

a set of vertically extending partitions for each said conduit, each said set comprising an inlet partition with its inner surface facing the direction of and open to the inlet opening of the conduit when located in said conduit chamber and an outlet partition with the outer surface facing in the direction of and open to the discharge opening of the conduit when in the conduit chamber, each partition of said set being movable to a position in said conduit chamber, said partitions of each said set being spaced apart along the length of each said conduit and each partition extending in a plane transverse to said length and each movable into and out of said conduit chambers, for each said conduit an elongated inlet partition slot in and extending through the bottom of each conduit chamber and the length of said slot extending transverse to the length of the conduit, said inlet partition slidably fitting in and occupying substantially the entire area of said inlet partition slot, said inlet partition in its raised position extending from the inlet partition slot in the botom wall portion of the conduit to the top wall portion of said conduit and from one side wall to the other side wall of said conduit and completely separating the portion of the conduit chamber on one side of the inlet partition from the portion thereof on the other, the top of said inlet partition being movable to the level of the top of said bottom conduit wall, said partition then occupying substantially the entire area of said inlet partition slot, an elongated outlet partition slot in and extending through the top of the conduit at a position spaced away from the inlet partition slot along the length of said conduit, said outlet partition extending lengthwise transverse to said conduit length, said outlet partition slidably fitting in said outlet partition slot and substantially completely filling the area of said outlet partition slot, the bottom of said outlet partition slot being movable to the bottom of said conduit top wall portion, said partition then substantially completely filling said outlet partition slot, independently movable positioning means operatively connected to each of said partitions, said positioning means each being supported on means attached to said reservoir chamber, and wherein the volume occupied by the top of each inlet partition in its upper, closed position is located within the inlet opening between the conduit chamber and the reservoir chamber, and comprising means connected to and holding said inlet partitions in their upper position and means connected to and holding said outlet partitions in their downward position, and comprising means supporting said positioning means for each said outlet partition movable in a direction parallel to the longitudinal axis of each said conduit and additional outlet partition slots in the top portion of each of the conduits, each such slot longitudinally spaced along the length of each said conduit from said inlet partition slot.

References Cited by the Examiner
UNITED STATES PATENTS

| | | | |
|---|---|---|---|
| 307,629 | 11/1884 | Church | 222—439 |
| 998,994 | 7/1911 | Smith | 222—436 |
| 1,095,245 | 5/1914 | Thomas | 222—439 X |
| 1,313,491 | 8/1919 | Lazzell | 222—450 X |
| 2,560,732 | 7/1951 | Moore | 222—561 X |

References Cited by the Applicant
UNITED STATES PATENTS

| | | |
|---|---|---|
| 643,683 | 2/1900 | Reid. |
| 919,917 | 4/1909 | McDuffie. |
| 933,764 | 9/1909 | Krawchenko. |
| 961,452 | 6/1910 | Krawchenko. |
| 1,194,487 | 8/1916 | Driscoll. |
| 1,414,571 | 5/1922 | Hutchins. |
| 1,442,137 | 1/1923 | Falkiner. |
| 1,517,923 | 12/1924 | Sylvester. |
| 1,669,624 | 5/1928 | Moore et al. |
| 1,823,905 | 9/1931 | Kreutzberg. |
| 2,781,955 | 2/1957 | Kidd. |

LOUIS J. DEMBO, *Primary Examiner.*

ROBERT B. REEVES, *Examiner.*

FRED R. HANDREN, *Assistant Examiner.*